United States Patent [19]

Baer et al.

[11] Patent Number: 5,603,656
[45] Date of Patent: Feb. 18, 1997

[54] PASSIVE VENTILATION DEVICE AND METHOD

[75] Inventors: Stephen C. Baer; David C. Harrison, both of Albuquerque, N.M.

[73] Assignee: Zomeworks Corporation, Albuquerque, N.M.

[21] Appl. No.: 526,479

[22] Filed: Sep. 11, 1995

[51] Int. Cl.⁶ .................................................. H01M 2/12
[52] U.S. Cl. ............................................. 454/339; 424/71
[58] Field of Search .................. 424/71, 82, 83; 454/237, 250, 339

[56] References Cited

U.S. PATENT DOCUMENTS

| | | |
|---|---|---|
| 627,010 | 6/1899 | Perdue . |
| 960,921 | 6/1910 | Hill . |
| 1,112,861 | 10/1914 | Snyder . |
| 1,236,673 | 8/1917 | Chamberlain . |
| 1,313,512 | 8/1919 | Bedell et al. . |
| 2,364,144 | 12/1944 | Hunsaker . |
| 3,271,710 | 9/1966 | Leonard . |
| 3,926,598 | 12/1975 | Filen . |
| 4,111,004 | 9/1978 | Blomberg . |
| 4,465,963 | 8/1984 | Iseard . |
| 4,524,609 | 6/1985 | Sharp ........................ 73/49.2 |
| 4,545,910 | 10/1985 | Marze . |
| 4,744,906 | 5/1988 | Gerlach et al. . |
| 4,957,522 | 9/1990 | Brassell . |
| 5,097,750 | 3/1992 | Oldham et al. . |
| 5,273,657 | 12/1993 | Nakashima et al. . |
| 5,341,083 | 8/1994 | Klontz et al. . |

FOREIGN PATENT DOCUMENTS

| | | | |
|---|---|---|---|
| 429332 | 9/1911 | France | 429/82 |
| 14061 | 12/1903 | Norway | 429/71 |
| 800329 | 8/1958 | United Kingdom . | |

*Primary Examiner*—Harold Joyce
*Attorney, Agent, or Firm*—Townsend and Townsend and Crew LLP

[57] ABSTRACT

A passive ventilation device and method for releasing hydrogen from an enclosure (3) housing a battery (9). The enclosure has an outer shell (11) and an inner insulating layer (13) that includes a gas permeable panel (7). The panel is disposed within the chamber adjacent one of the sidewalls of the enclosure. The sidewall has an inlet opening (34) and an exhaust opening (36) in communication with a ventilation space (32) for providing an upward air flow through the ventilation space to draw hydrogen through the gas permeable panel into the ventilation space. The upward air flow can be powered by the low density hydrogen and/or by heating the air within the ventilation space to a temperature greater than the ambient temperature.

22 Claims, 1 Drawing Sheet

5,603,656

PASSIVE VENTILATION DEVICE AND METHOD

FIELD OF THE INVENTION

This invention relates to passive ventilation systems generally, and more specifically to a device and method for passively venting a low density gas, such as hydrogen, from a battery chamber.

BACKGROUND OF THE INVENTION

Battery charging commonly occurs in millions of remote cabinets, office buildings and electric vehicles. Unfortunately, battery charging has resulted in numerous explosions that destroy the battery and its container and possibly injure or kill people. These explosions are often caused by igniting hydrogen in insufficiently ventilated battery chambers.

When batteries are overcharged, the current in the cell produces hydrogen. Hydrogen becomes an explosion hazard when its concentration rises to about 4% volume in air, generally referred to as the lower explosive limit (LEL). To avoid this hazard, battery chambers are typically vented to release the hydrogen to the environment. Ventilation can be generated by active venting systems such as small fans located within the battery chamber or large passive vents that allow flow by convection and diffusion between the inside gas and the outside air.

Passive ventilation systems generally work by taking advantage of the fact that ambient air is denser than hydrogen. Thus, hydrogen released into a battery chamber by overcharging batteries lessens the density of the gas causing it to rise within the chamber. Typically, the chamber will have one lower and one upper vent so that the rising gas within the chamber flows out through the upper vent. Fresh outside air will then flow through the lower vent to replace the lost gas in the chamber.

One problem with existing passive ventilation systems is that they are typically sensitive to temperature differences between the air inside the battery chamber and the outside environment. Warmer air tends to rise in the same manner as lower density air. If the inside temperature is cooler, for example, the cooler air will be urged downward thereby counteracting the convective flow caused by the lower density hydrogen in the chamber. In fact, if the inside temperature is substantially cooler (on the order of 2%), convective flow completely stops and the hydrogen concentration will slowly build-up in the chamber. If the inside temperature is warmer, the inside gas will rise causing unwanted ventilation when there is no hydrogen present in the chamber.

SUMMARY OF THE INVENTION

The present invention is directed to a system and method for passively venting a low density gas, such as hydrogen, from a battery chamber. The passive ventilation system comprises an enclosure having outer walls and an inner chamber for housing a battery. A thermally insulating, gas permeable panel is disposed within the enclosure adjacent one of the outer walls of the enclosure. The gas permeable panel defines a ventilation space between the panel and the enclosure wall for allowing hydrogen gas within the inner chamber to diffuse through the gas permeable panel into the ventilation space. The enclosure further includes a lower inlet opening and an upper exhaust opening vertically spaced in one of the outer walls and in communication with the ventilation space to allow for discharge of buoyant hydrogen enriched air through the upper exhaust opening and for intake of ambient air through the lower inlet opening.

The present invention releases the potentially harmful hydrogen gas to the environment simply by allowing the hydrogen to diffuse through a gas permeable material, such as cardboard or fiberglass. The cardboard or fiberglass panel thermally insulates the battery chamber so to minimize any adverse temperature effects of the surrounding environment. The panel also insulates the inner chamber so that the hydrogen enriched air diffusing therethrough will not lose that much heat (even during very cold days). A loss of heat would counteract the convective flow provided by the lower density hydrogen. In addition, the outer walls of the enclosure protect the thermally insulating panel from damage due to winds, dust, insects, etc.

The invention further comprises means for creating an air flow through the ventilation space to draw the hydrogen gas in the inner chamber through the gas permeable panel into the ventilation space. In a specific configuration, the air flow through the ventilation space is created by vertically spacing the exhaust opening above an inlet opening in one of the outer walls of the enclosure. The hydrogen enriched air within the ventilation space is less dense than the ambient air outside of the enclosure and, therefore, rises through the ventilation space and exits through the exhaust opening. Ambient air enters the inlet opening to replace the hydrogen enriched air, thereby creating a convective flow through the ventilation space. This convective flow effectively ensures that the concentration of hydrogen is less in the ventilation space than within the inner chamber so that hydrogen will flow outward from the inner chamber to the ventilation space (rather than flowing inward into the inner chamber).

In a specific configuration, the enclosure comprises an outer metal shell and an inner insulating layer disposed within the metal shell. The gas permeable panel forms a portion of the insulating layer for thermally insulating the battery within the inner chamber. The metal shell serves to protect the insulating layer from the environment. In addition, the metal shell may be used to create additional air flow through the ventilation space by transferring heat to the air therein. During the day, the air within the ventilation space becomes warmer than the ambient air, which further lowers its density, thereby creating a stronger upward air flow. During the night, the metal shell will radiate a small portion of this heat into the night sky, but generally not enough heat to substantially lower the temperature within the ventilation space.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
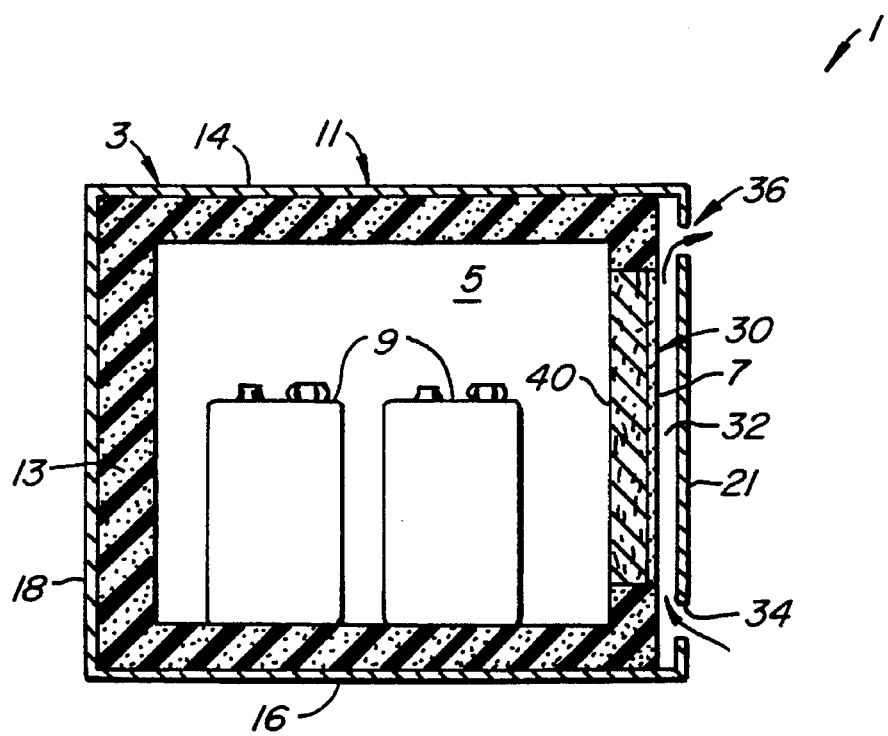
FIG. 1 is a side cross-sectional view of a passive ventilation system comprising an enclosure for housing a battery in accordance with the present invention.

Referring to the drawings in detail, wherein like numerals indicate like elements, a passive ventilation system 1 is illustrated according to the principles of the present invention. Passive ventilation system 1 generally includes an enclosure 3 defining an inner chamber 5 and a gas permeable panel 7 within enclosure 3 for allowing a low density gas, such as hydrogen, to diffuse therethrough, thereby releasing built-up hydrogen from the inner chamber 5.

Referring to FIG. 1, enclosure 3 is preferably a conventional battery chamber configured to house batteries 9 that emit hydrogen when overcharged, such as lead acid batteries. Enclosure 3 includes an outer shell 11 and an insulating layer 13 disposed within outer shell 11. Outer shell 11 has a top wall 14, a bottom wall 16 and four substantially vertical sidewalls 18–21. The walls of outer shell 11 are impervious to gases and are constructed of a highly thermally conductive material, such as aluminum or steel, to facilitate heat transfer therethrough (discussed below). Insulating layer 13 extends around the inner surface of top wall 14, bottom wall 16 and sidewalls 18–21 and preferably comprises a thermally insulating material, such as polystyrene or polyurethane foam, to protect batteries 9 from the elements, including extreme heat and cold. Although enclosure 3 is shown as having a rectangular shape, enclosure 3 can have a variety of sizes and shapes depending on the particular batteries housed therein.

As shown in FIG. 1, gas permeable panel 7 forms a portion of insulating layer 13. In a specific configuration, panel 7 is integrally attached to insulating layer 13 and disposed adjacent one of the sidewalls 21. Insulating layer 13 preferably contacts, or is at least adjacent to, substantially the entire inner surface of outer shell 11 (i.e., the top, bottom and three of the sidewalls 18–20). However, sidewall 21 of shell 11 is spaced away from gas permeable panel 7 to define a ventilation space 32 therebetween. Ventilation space 32 extends along the substantially the entire length and width of sidewall 21 and is preferably about 0.5 to 2 inches deep to allow sufficient air flow therethrough, as discussed below.

Figure 2:
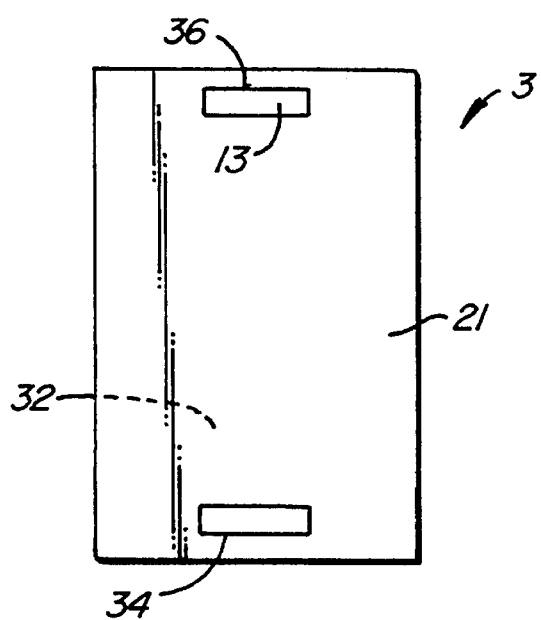
FIG. 2 is a front view of the passive ventilation system of FIG. 1 illustrating inlet and exhaust openings for creating an air flow within the enclosure.

As shown in FIGS. 1 and 2, sidewall 21 defines an inlet opening 34 and an exhaust opening 36 in communication with ventilation space 32. Inlet and exhaust openings 34, 36 preferably have an area of about ⅛ to ¼ of the area of gas permeable panel 7 and will include louvres with insert screens (not shown) to protect ventilation space 32 from weather and other contaminants, such as dirt, insects, etc. Exhaust opening 36 is spaced vertically above inlet opening 34 so that a low density gas within ventilation space 32 will rise and exit through exhaust opening 36 as ambient air enters inlet opening 34. Of course, one skilled in the art will recognize that the invention is not limited to the exact configuration shown in the drawings. For example, inlet opening 34 and exhaust opening 36 can be disposed closer together or farther apart. In addition, these openings could be formed in different sidewalls 18–20 or even in top and bottom walls 14, 16 so long as they are in communication with ventilation space 32 and inlet opening 34 is disposed vertically above exhaust opening 36.

Figure 3:
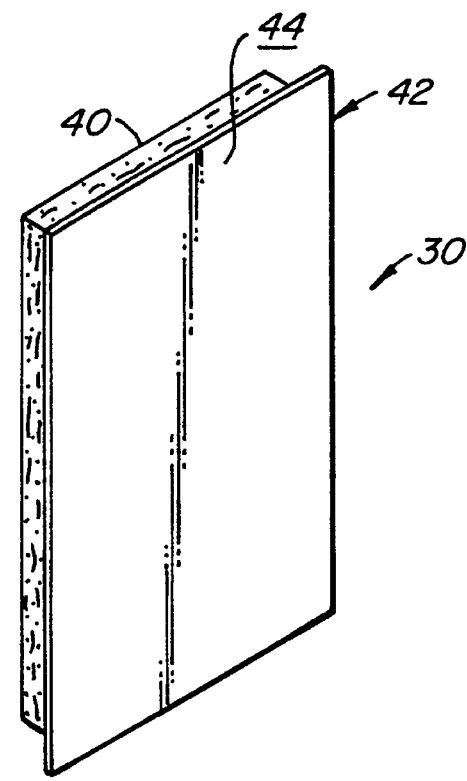
FIG. 3 is an enlarged view of a gas permeable membrane for allowing hydrogen gas to diffuse through the enclosure of FIG. 1 to passively vent the hydrogen from the enclosure.

Referring to FIG. 3, gas permeable panel 7 comprises a thermally insulating membrane 40 constructed of a material that will substantially insulate inner chamber 5 and will allow a low density, hazardous gas, such as hydrogen, to pass therethrough. Preferably, membrane 40 will have a thermal conductivity less than 1 BTU in/ft$^{2\circ}$ F. per hr, and more preferably less than 0.5 BTU in/ft$^{2\circ}$ F. per hr. Membrane 40 will also have a hydrogen conductivity rate of greater than 25 ml*in/ft$^2$ per min (at 1% concentration of $H_2$ within inner chamber 5) and preferably greater than 50 ml,in/ft$^2$ per min (at 1% concentration of $H_2$). In a specific configuration, membrane 40 comprises a rigid fiberglass duct board having a thickness between 1 to 3 inches. Applicant has found that this material has a thermal conductivity of about 0.25 BTU in/ft$^{2\circ}$F. per hr and a hydrogen conductivity of about 100 ml,in/ft$^2$ per min (1% concentration of $H_2$).

Gas permeable panel 7 may further include an outer film 42 attached to an outer surface 44 of membrane 40. Outer film 42 serves to protect the fiberglass membrane from moisture and dirt that may enter with the ambient air through inlet opening 34. In a specific configuration, film is a layer of water-proof plastic, such as TyVek™ from DuPont Chemical, that will allow hydrogen to diffuse therethrough. Although the plastic layer will tend to lower the rate of hydrogen permeation through gas permeable panel 7, applicant has found that the combined hydrogen conductivity rate of the plastic and the fiberglass membrane is sufficient to ventilate inner chamber 5 (i.e., about half the rate of the fiberglass membrane alone).

It should be noted that the invention is not limited to the above described materials for gas permeable panel 7. A variety of materials or combinations of materials can be used so long as they are permeable to hydrogen and at least partially impermeable to heat.

In operation, enclosure 3 is adapted to house a device that may emit a low density, hazardous gas such as a battery 7 that emits hydrogen when it is overcharged. When hydrogen is produced within chamber 5, it diffuses through gas permeable panel 7 into ventilation space 32. The flow of hydrogen through panel 7 will be generally proportional to the difference in hydrogen concentration between the air within ventilation space 32 and the air within inner chamber 5. Thus, if the hydrogen concentration within ventilation space 32 becomes greater than the hydrogen concentration within inner chamber 5, hydrogen may diffuse in the wrong direction from space 32 to chamber 5. Therefore, it is important to ventilate space 32 to maintain a low hydrogen concentration in this space.

In one configuration, this ventilation is powered by the hydrogen itself. The hydrogen enriched air within ventilation space 32 (once hydrogen begins to diffuse through panel 7) lowers the density of the air within space 32 causing it to rise and flow out through exhaust opening 36. At the same time, higher density, fresh ambient air enters inlet opening 34 to replace the hydrogen enriched air. As the ambient air rises through space 32, it generates a convective draft that draws hydrogen through gas permeable panel 7.

If the temperature of ventilation space 32 drops substantially below the ambient temperature, this temperature differential may have an adverse effect on the hydrogen generated updraft described above. This is because cold air is more dense than hot air and, therefore, the colder air within ventilation space 32 will offset the hydrogen updraft and possibly cause stagnation or even a downdraft within space 32. To minimize this effect, insulation separates ventilation space 32 from the cool batteries 9 and the air within ventilation space 32 is closely coupled to ambient air through the walls of outer shell 11. Therefore, the air within ventilation space will virtually never cool substantially below the ambient temperature.

In a specific configuration, the ventilation space 32 is heated by constructing the outer shell 11 (or at least sidewall 21 of outer shell 11) of metal, such as aluminum or stainless steel. During the day, the metal outer shell 11 receives heat from the sun and transfers this heat into ventilation space 32 to increase the air temperature therein. At night, this passive heat exchange will have the opposite effect because the metal shell will radiate heat to the night sky. However, the applicant has found that sidewalls generally radiate substantially less heat (about 40% less) than a top wall or roof. Therefore, it has been found that sidewall 21, at night, will not radiate enough heat to substantially drop the temperature of the air within ventilation space 32 below the ambient temperature. Accordingly, the hydrogen generated updraft within ventilation space 32 will not stagnate in most climates.

Other modifications and variations can be made to disclose embodiments without departing from the subject invention as defined in the following claims. For example, ventilation space 32 may be heated in a variety of conventional manners to ensure that an upward air flow exists within space 32, e.g., actively applying thermal energy. Alternatively, an air flow may be created within space 32 by other active or passive means, such as positioning a small fan within space 32.

In addition, it should be noted that the gas permeable panel 7 is not limited to the configuration described above and illustrated in FIGS. 1–3. For example, the size of panel may be optimized to provide an appropriate flow of hydrogen therethrough. The panel may comprise a larger portion of insulating layer 13, e.g., covering two or more of the sidewalls. Alternatively, the invention may include a plurality of smaller panels distributed around inner chamber 5 to provide a more uniform diffusion of hydrogen from inner chamber 5.

What is claimed is:

1. A passive ventilation system comprising:
   an enclosure having outer walls defining an inner chamber for housing a battery therein;
   a thermally insulating, gas permeable panel disposed adjacent one of the outer walls of the enclosure and having a first surface facing into the inner chamber and a second surface opposite the first surface, the second surface defining a ventilation space between the panel and said one of the outer walls for diffusing a low density gas within the inner chamber through the gas permeable panel into the ventilation space; and
   an exhaust opening in one of the outer walls in communication with the ventilation space for discharging the low density gas from the ventilation space.

2. The system of claim 1 wherein said one of the outer walls of the enclosure defines an inlet opening in communication with the ventilation space and spaced vertically below the exhaust opening to allow the low density gas within the ventilation space to rise through the space and exit the exhaust opening as ambient air flows through the inlet opening.

3. The system of claim 1 wherein said one of the outer walls of the enclosure defines an inlet opening in communication with the ventilation space and spaced vertically below the exhaust opening, the system further comprising means for transferring heat to the ventilation space such that air within the ventilation space has a temperature greater than a temperature of ambient air exterior to the enclosure, the air within the ventilation space rising through said space and exiting the exhaust opening as the ambient air enters the inlet opening.

4. The system of claim 3 wherein the enclosure includes an outer metal shell having a top wall, a bottom wall and sidewalls, the gas permeable panel being disposed adjacent one of the sidewalls of the outer metal shell, said one of the sidewalls heating the air within the ventilation space through passive conduction of heat from the ambient air during the day.

5. The system of claim 4 further comprising a thermally insulating layer circumscribing the inner chamber within the outer metal shell, the gas permeable panel forming a portion of the thermally insulating layer.

6. The system of claim 1 wherein the gas permeable panel comprises a material having a thermal conductivity less than 0.5 BTU in/ft$^{2\circ}$ F. per hr.

7. The system of claim 1 wherein the gas permeable panel comprises a material having a hydrogen conductivity rate of greater than 50 ml*in/ft$^2$ per min.

8. The system of claim 1 wherein the gas permeable panel comprises fiberglass duct board.

9. The system of claim 8 wherein the gas permeable panel further comprises an outer plastic film adhered to the fiberglass duct board opposite said one of the outer walls for shielding the fiberglass duct board.

10. The system of claim 1 wherein the low density gas is hydrogen.

11. An apparatus for venting hydrogen gas from a battery chamber comprising:
    an enclosure having a top wall, a bottom wall and sidewalls defining an inner chamber for housing a battery therein;
    a thermally insulating, gas permeable panel disposed adjacent one of the sidewalls of the enclosure and having a first surface facing into the inner chamber and a second surface opposite the first surface, the second surface defining a ventilation space between the panel and said one of the sidewalls;
    means for creating an air flow through the ventilation space for drawing hydrogen gas within the inner chamber through the gas permeable panel into the ventilation space; and
    an exhaust opening in one of the sidewalls in communication with the ventilation space for discharging the low density gas from the ventilation space.

12. The system of claim 11 wherein said one of the sidewalls of the enclosure defines an inlet opening in communication with the ventilation space and spaced vertically below the exhaust opening to allow the hydrogen gas within the ventilation space to rise through the space and exit the exhaust opening as ambient air flows through the inlet opening.

13. The system of claim 11 wherein said one of the sidewalls of the enclosure defines an inlet opening in communication with the ventilation space and spaced vertically below the exhaust opening.

14. The system of claim 13 wherein at least said one of the sidewalls of the enclosure is constructed of metal, the gas permeable panel being disposed adjacent said metal sidewall to heat the air within the ventilation space through passive radiation of heat from the ambient air during the day.

15. A method for passively venting a low density gas from a chamber comprising:
    providing an enclosure having outer walls and an inner chamber for housing a battery;
    creating an air flow through a ventilation space between one of the outer walls of the enclosure and a gas permeable panel disposed between said one of the outer walls and the inner chamber;
    diffusing the low density gas through the gas permeable panel into the ventilation space; and discharging the low density gas through an exhaust opening in one of the outer walls of the enclosure.

16. The method of claim 15 wherein the creating step comprises creating an upward air flow from an inlet opening in said one of the outer walls to the exhaust opening.

17. The method of claim 16 wherein the creating an upward air flow step comprises:

heating air within the ventilation space to a temperature greater than a temperature of the ambient air; and allowing the heated air to rise through the ventilation space and flow through the exhaust opening, the ambient air flowing through the inlet opening to thereby replace the heated air within the ventilation space.

18. The method of claim 16 wherein the creating an upward air flow step comprises:

diffusing hydrogen gas from the inner chamber through the gas permeable panel into the ventilation space to produce lower density, hydrogen enriched air within the ventilation space; and allowing the lower density, hydrogen enriched air to rise through the ventilation space and exit the exhaust opening as higher density, ambient-air flows through the inlet opening.

19. The method of claim 15 wherein the diffusing step is carried out by diffusing hydrogen through the gas permeable panel at a rate greater than 50 ml,in/ft$^2$ per min.

20. The method of claim 15 wherein the gas permeable panel comprises fiberglass duct board.

21. The method of claim 20 wherein the gas permeable panel further comprises an outer plastic film adhered to the fiberglass duct board opposite said one of the outer walls for shielding the fiberglass duct board.

22. The method of claim 15 further comprising the step of thermally insulating the inner chamber with the gas permeable panel.

* * * * *